(12) United States Patent
Ozdemir et al.

(10) Patent No.: US 9,229,128 B2
(45) Date of Patent: Jan. 5, 2016

(54) ESTIMATING AND CORRECTING PERTURBATIONS ON SEISMIC PARTICLE MOTION SENSORS EMPLOYING SEISMIC SOURCE SIGNALS

(75) Inventors: Ahmet Kemal Ozdemir, Asker (NO); Nicolas Goujon, Oslo (NO); Lars Borgen, Sande (NO)

(73) Assignee: WesternGeco L.L.C., Houston, TX (US)

( * ) Notice: Subject to any disclaimer, the term of this patent is extended or adjusted under 35 U.S.C. 154(b) by 1259 days.

(21) Appl. No.: 12/193,040

(22) Filed: Aug. 17, 2008

(65) Prior Publication Data

US 2010/0039888 A1   Feb. 18, 2010

(51) Int. Cl.
*G01V 1/36* (2006.01)
*G01V 13/00* (2006.01)
*G01V 1/38* (2006.01)

(52) U.S. Cl.
CPC ........ *G01V 13/00* (2013.01); *G01V 1/36* (2013.01); *G01V 1/3808* (2013.01); *G01V 2210/32* (2013.01)

(58) Field of Classification Search
CPC ....... G01V 1/36; G01V 1/3808; G01V 13/00; G01V 2210/32
USPC ................. 364/421; 367/13, 21, 24
See application file for complete search history.

(56) References Cited

U.S. PATENT DOCUMENTS

| | | | |
|---|---|---|---|
| 3,283,293 A | 11/1966 | Pavey et al. | |
| 5,235,554 A * | 8/1993 | Barr et al. | 367/13 |
| 5,723,790 A | 3/1998 | Anderson | |
| 5,774,417 A * | 6/1998 | Corrigan et al. | 367/24 |
| 6,522,797 B1 | 2/2003 | Siems et al. | |
| 7,050,355 B2 * | 5/2006 | Robertsson et al. | 367/19 |
| 2004/0042341 A1 | 3/2004 | Tenghamn et al. | |
| 2004/0054478 A1 | 3/2004 | Brygynevych | |
| 2005/0018537 A1 | 1/2005 | Welker et al. | |
| 2005/0160814 A1 | 7/2005 | Vaganov et al. | |
| 2005/0194201 A1 | 9/2005 | Tenghamn et al. | |
| 2005/0195686 A1 * | 9/2005 | Vaage et al. | 367/21 |
| 2005/0202585 A1 | 9/2005 | Eskridge | |
| 2005/0265122 A1 * | 12/2005 | Grion | 367/21 |

(Continued)

FOREIGN PATENT DOCUMENTS

| | | |
|---|---|---|
| GB | 2379505 | 3/2003 |
| GB | 2420625 | 5/2006 |

(Continued)

OTHER PUBLICATIONS

PCT Search Report, dated Mar. 26, 2010, Application No. PCT/US2009/053449.

(Continued)

*Primary Examiner* — Daniel L Murphy

(57) ABSTRACT

A computer-implemented method includes accessing a set of multicomponent marine noise data exhibiting a plurality of polarization vectors at each of a plurality of co-located pressure and particle motion data points on a marine seismic survey apparatus; and determining a set of perturbation noise data for the marine seismic survey apparatus from the polarization vectors. Computer readable program storage media are encoded with instructions that, when executed by a processor, perform the computer-implemented method. A computing apparatus is programmed to perform the computer-implemented method.

39 Claims, 7 Drawing Sheets

(56) References Cited

U.S. PATENT DOCUMENTS

2006/0245300 A1* 11/2006 De Kok et al. .................. 367/15
2006/0253256 A1 11/2006 Robertsson et al.

FOREIGN PATENT DOCUMENTS

| WO | 02073239 | 9/2002 |
| WO | 2004081583 A1 | 9/2004 |
| WO | 2007149702 | 12/2007 |

OTHER PUBLICATIONS

Extended European Search Report of European Application No. 09808616.8 dated Jan. 27, 2014: pp. 1-8.
Schalkwijk et al., "Application of Two-Step Decomposition to Multicomponent Ocean-Bottom Data: Theory and Case Study," Journal of Seismic Exploration, 1999, vol. 8: pp. 261-278.

* cited by examiner

ESTIMATING AND CORRECTING PERTURBATIONS ON SEISMIC PARTICLE MOTION SENSORS EMPLOYING SEISMIC SOURCE SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention disclosure relates to marine seismic surveying, and, in particular, to estimation and correction of perturbations on seismic particle motion sensors in such a survey.

2. Discussion of Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

Seismic exploration involves surveying subterranean geological formations for hydrocarbon deposits. A survey typically involves deploying seismic source(s) and seismic sensors at predetermined locations. The sources impart acoustic waves into the geological formations. Features of the geological formation reflect the pressure waves to the sensors. The sensors receive the reflected waves, which are detected, conditioned, and processed to generate seismic data. Analysis of the seismic data can then indicate the presence or absence of probable locations of hydrocarbon deposits.

Some surveys are known as "marine" surveys because they are conducted in marine environments. Note that marine surveys may be conducted not only in saltwater environments, but also in fresh and brackish waters. Marine surveys come in at least two types. In a first type, an array of seismic cables (known as "streamers") and seismic sources is towed behind a survey vessel. In a second type, an array of seismic cables (known as "ocean bottom cables"), each of which includes multiple sensors, is laid on the ocean floor, or seabed, and a seismic source is towed from a survey vessel.

Historically, towed array, marine seismic surveys only employed pressure waves and the receivers detected any passing wavefront. This includes two types of wavefronts. The first are those reflected upward to the receivers from the geological formation. The second are those that are reflected downward from the surface of the water. The upward reflections are desirable because they generally contain information about the geological formation under survey. The downward reflections are undesirable because they interfere with the upward reflections and reduce the bandwidth of the seismic signal.

The art has therefore recently begun moving to "multicomponent" surveys in which, for example, not only is the passing of a wavefront detected, but also the direction in which it is propagating. Knowledge of the direction of travel permits determination, for instance, of which wavefronts are traveling upward and which are traveling downwards. Multicomponent towed-array surveys include a plurality of receivers that detect not only the pressure wave, but also the velocity, or time derivatives (e.g., acceleration) thereof, of the passing wavefront. These receivers will hereafter be referred to as "particle motion sensors" because they measure the velocity or acceleration of displaced particles. The pressure sensor is typically a hydrophone, and the particle motion sensors are typically geophones or accelerometers.

However, multicomponent surveys are more sensitive to what may be called "perturbations". One kind of perturbation, for example, is what is known as an "alignment perturbation". Sensors in a streamer that form a part of a towed array are frequently oriented in an orthogonal x-y-z coordinate system in which the x-y-z axes are defined as in-line with the streamer, cross-line to the streamer, and in depth. In an alignment perturbation, the sensor is misaligned relative to the streamer such that one or more of its x-y-z axes is out of alignment with the corresponding in-line, cross-line, and depth axes of the streamer. This is but one example of a perturbation, and there are others. Another kind, for example, pertains to amplitude sensitivities.

Perturbations are undesirable because they also lead to errors in the seismic data that is acquired in the survey. Errors in the data, in turn, can lead to errors in the analysis for the location of the hydrocarbon deposits. Those in the art have therefore begun to develop techniques by which this error can be eliminated, or at least mitigated.

The present invention is directed to overcoming, or at least reducing the effects of, one or more of the problems set forth above.

BRIEF SUMMARY OF THE INVENTION

In a first aspect, the invention is a computer-implemented method, comprising: accessing a set of multicomponent marine calibration data exhibiting a plurality of polarization vectors at each of a plurality of paired pressure and particle motion data points on a marine seismic survey apparatus; determining a set of perturbations for the marine seismic survey apparatus from the polarization vectors; and determining a set of calibration values corresponding to the perturbations.

In a second aspect, the invention includes a method, comprising: acquiring a set of calibration data for a marine survey apparatus including paired pressure and particle motion sensors; performing a marine seismic survey using the paired pressure and particle motion sensors to acquire a set of seismic survey data; and mitigating the perturbation noise in the seismic survey data. Acquiring the calibration data includes: imparting a plurality of seismic signals at different times and from different depths in a marine environment; and acquiring a set of calibration data from reflections of the seismic signals at the paired pressure and particle motion sensors. Mitigating the perturbations includes: estimating the perturbations on the response of the marine survey apparatus by using the acquired calibration signal; determining the calibration values on the response of the marine survey apparatus to undo the perturbations; and removing the estimated perturbations on the response of the marine survey apparatus.

In a third aspect, the invention is a method, comprising: estimating a set of perturbations on the response of a marine survey apparatus including paired pressure and particle motion sensors, performing a marine seismic survey using the paired pressure and particle motion sensors to acquire a set of seismic survey data, and mitigating the perturbation errors in the seismic survey data. Estimating the perturbations includes: imparting a plurality of acoustic calibration signals at different times and from different depths in a marine environment; acquiring a set of reflections of the acoustic calibration signals at a plurality of paired pressure and particle motion sensors; relating the polarization parameters of the acquired set of acoustic calibration signals to the perturbations on the response of the seismic survey apparatus; and estimating the perturbations and calibration values based on the relationship.

In a fourth aspect, the invention includes a marine seismic surveying apparatus, comprising; a seismic survey vessel; at least one seismic source capable of imparting a plurality of seismic calibration signals at different times and from different depths in a marine environment; a plurality of seismic cables including a plurality of paired pressure and particle motion sensors distribute along the length thereof and capable of acquiring a set of reflections of the seismic calibration signals at the paired pressure and particle motion sensors; and a computing apparatus aboard the seismic survey vessel. The computing apparatus is capable of: accessing a set of multicomponent calibration data exhibiting a plurality of polarization vectors at each of a plurality of paired pressure and particle motion data points on a marine seismic survey apparatus; determining a set of perturbations for the marine seismic survey apparatus from the polarization vectors; and determining a set of calibration values corresponding to the perturbations.

In other aspects the invention includes computer readable program storage media encoded with instructions that, when executed by a processor, perform the software implemented aspects of the invention and computing apparatus programmed to perform those aspects.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
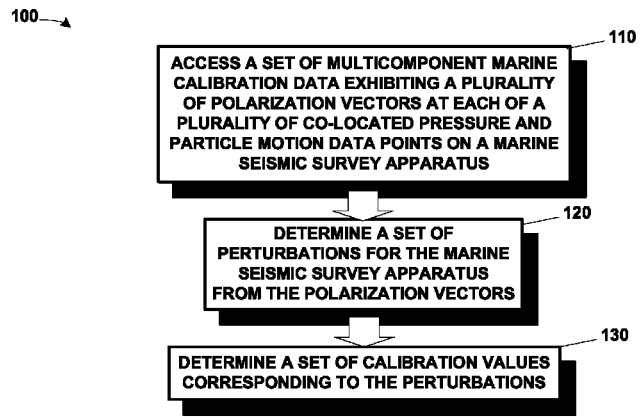
FIG. 1 illustrates one particular embodiment of a method practiced in accordance with one aspect of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention includes a technique for estimating and correcting perturbations in multicomponent seismic data acquired in a marine survey. The technique includes, in various aspects and embodiments, a computer-implemented method, various apparatuses for use in implementing the method, and a seismic data set in which perturbation error has been mitigated through performance of the method.

The present invention, more particularly, is directed to a technique by which acquired seismic data can be corrected for perturbations. The effect of these perturbations in the acquired seismic data can be described as noise since it interferes with the information that actually describes the geological formation under survey. Still more particularly, the present invention describes a technique for estimating and mitigating perturbations in a multicomponent seismic data including co-located pressure and particle motion measurements.

The technique relates the perturbation noise to physical model parameters such as sensor sensitivities and sensor alignment misalignment angle with respect to cable axis. The components and the magnitude of the polarization vectors are then related to an acquired calibration signal with particle motion and pressure sensors. The perturbations are then estimated by using the measured polarization information from a plurality of seismic sources that are shot while the seismic streamer is towed by a seismic vessel.

As used herein, the "perturbation noise" is the difference between the recorded seismic data in the absence of any perturbations and the recorded seismic data in the presence of physical parameter model errors. In this context, the "perturbations" are the deviations of physical parameters of the sensor from their nominal values. These include sensitivity and alignment perturbations as mentioned above. Hence, perturbation noise can be quantified as a function of sensitivities and misalignment angles. The signals measured by pressure and particle motion sensors are functions of magnitude of the polarization vector and the angles between the components of the polarization vector. The sensitivities of the sensor can therefore be estimated from magnitude of the polarization vector and alignment of the sensors can be estimated from the direction of the polarization vector. The presence of co-located data points from pressure sensors and particle motion sensors in a multicomponent streamer allows estimation of sensor sensitivities independent of sensor alignment. Because the new technique uses signal records for correction of perturbation errors, it may be referred to as a Signal-based Perturbation Estimation and Correction ("SPEC") technique.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

Figure 2:
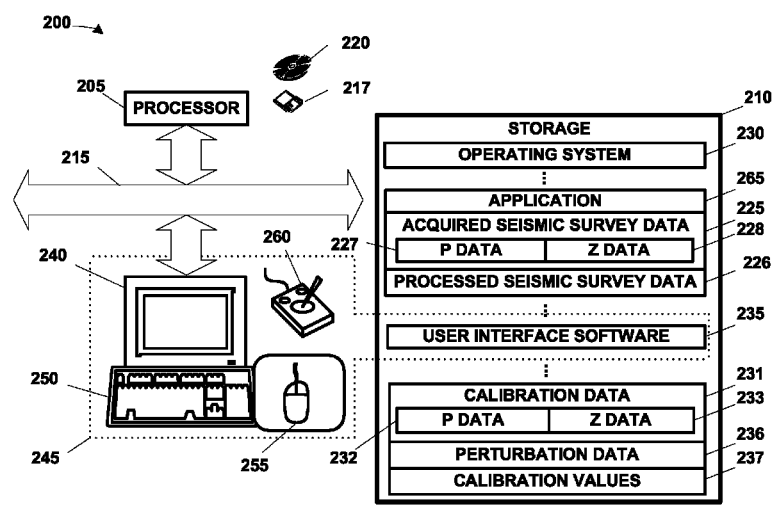
FIG. 2 depicts a computing apparatus on which one particular embodiment of the present invention may be practiced.

Turning now to the drawings, wherein like reference numbers correspond to similar components throughout the several views, FIG. 1 presents a computer-implemented method 100 that may be performed on an apparatus such as the computing apparatus 200 of FIG. 2 in the mitigation of perturbation error in multicomponent marine seismic survey data. The technique disclosed herein develops a set of calibration data for characterization of perturbation noise in marine seismic survey data. The calibration data is acquired in such a manner that it exhibits a plurality of polarization vectors at each of a plurality of co-located pressure and particle motion data points. The perturbations are estimated from the calibration data acquired in, for example, the manner illustrated in FIG. 3A-FIG. 3C and discussed further below. Once the perturbations are estimated, the response of the marine survey apparatus can be calibrated to mitigate the perturbation noise on seismic survey data.

FIG. 2 shows selected portions of the hardware and software architecture of a computing apparatus 200 such as may be employed in some aspects of the present invention. The computing apparatus 200 includes a processor 205 communicating with storage 210 over a bus system 215. The storage 210 may include practically any type of medium, including a hard disk and/or random access memory ("RAM") and/or removable storage such as a floppy magnetic disk 217 and an optical disk 220.

The storage 210 is encoded with the acquired seismic survey data 225. The acquired seismic survey data 225 is "multicomponent" data and includes, as is shown in FIG. 2, both pressure data 227 (i.e., "P data") and particle motion data 228 (e.g., "Z data"). The storage 210 is furthermore encoded with calibration data 231, which is also "multicomponent" data and is similarly comprised of pressure data 232 and particle motion data 233. The calibration data 231 is acquired as described further below in a manner such that it exhibits a plurality of polarization vectors at each of a plurality of co-located pressure and particle motion data points.

Note that the acquired seismic survey data 225 and calibration data 231 are digital at the time they are stored on the storage 210. In the particular embodiments disclosed herein, the acquired seismic survey data 225 and calibration data 231 are digital at the point of acquisition. However, the point of digitization may vary depending on the implementation. The data may therefore be digital upon output from the sensors (not shown) by which it is acquired or upon conversion after output and prior to storage.

The acquired seismic survey data 225 and calibration data 231 may be stored using any suitable data structure known to the art. The data structure will typically be, for example, a flat file or a text delimited file. However, acceptable alternatives include structures such as a database, a list, a tree, a table, etc. The invention is not limited by the manner in which the acquired seismic survey data 225 and calibration data 231 are stored.

The storage 210 is also encoded with an operating system 230, user interface software 235, and an application 265. The user interface software 235, in conjunction with a display 240 and peripheral I/O devices such as a keypad or keyboard 250, a mouse 255, or a joystick 260, implements a user interface 245. The processor 205 runs under the control of the operating system 230, which may be practically any operating system known to the art. The application 265, when invoked, performs the method of the present invention, e.g., the method 100 of FIG. 1. The user may invoke the application in conventional fashion through the user interface 245.

Referring now to both FIG. 1 and FIG. 2, the method 100 is a computer-implemented method for determining perturbations—represented by the perturbation data 236—and the corresponding calibration values 237 associated with a given marine survey apparatus. The calibration values 237 can then, in another aspect of the invention, be used to calibrate the response of the marine survey apparatus to mitigate perturbation errors in the marine survey data 225. In the illustrated embodiment, the method 100 is performed by the execution of the application 265 by the processor 205 under the control of the OS 230, all shown in FIG. 2 and discussed above. Note, however, that the invention is not limited by the nature of the software component by which the method is implemented. In alternative embodiments, for example, the method 100 may be implemented in, e.g., a utility or some other kind of software component.

The method 100 begins by first accessing (at 110) a set of multicomponent marine calibration data exhibiting a plurality of polarization vectors at each of a plurality of co-located pressure and particle motion data points on a marine seismic survey apparatus. The polarization vector polVect(t) is the vector composed of x, y, z components of the measurement:

$$polVec(t)=[v_x(t)v_z(t)]$$

where t is the time, and x, y, and z are the inline, crossline, and vertical directions that define a Cartesian coordinate system described further below and $v_x$, $v_y$, $v_z$ denote the particle motion measurements along the time x, y, and z coordinates. Polarization angles are the angles between the components of the polarization vector.

Note that for a plane wave, the polarization angles are constant and independent of time. In other words if one plots the tip of the vector polVec(t) as a function of t, it will stay on a line in a three-dimensional ("3D") coordinate system. The angle that the line makes with respect to the x, y, z axes of the 3D coordinate system will be the same as polarization angles. For this type of a plane wave, it is said that the wave (signal) is linearly polarized.

The method 110 then determines (at 120) a set of perturbations from the calibration data 231 for the marine seismic survey apparatus from the polarization vectors. The perturbation noise is the difference between the recorded data in the absence of any perturbation errors and the recorded data in the presence of sensitivity and alignment perturbation errors. In the illustrated embodiment, the perturbation noise on the calibration signal is related to the perturbations on the physical model parameters such as sensor sensitivity deviation from the nominal sensitivity and misalignment angle with respect to cable axis. The components and the magnitude of the polarization vector are then related to the acquired signal with particle motion and pressure sensors. The signals measured by pressure and particle motion sensors are functions of magnitude of the polarization vector and the angles between the components of the polarization vector.

The method 100 then continues by determining (at 130) a set of calibration values corresponding to the perturbations. Those skilled in the art having the benefit of this disclosure will appreciate that the nature of the calibrations will be dependent upon the nature of the perturbation. Similarly, so will their application.

Those skilled in the art having the benefit of this disclosure will also appreciate that, because of the source of the perturbation noise, the calibration data and the seismic survey data should be acquired using the same apparatus.

Figure 3A:
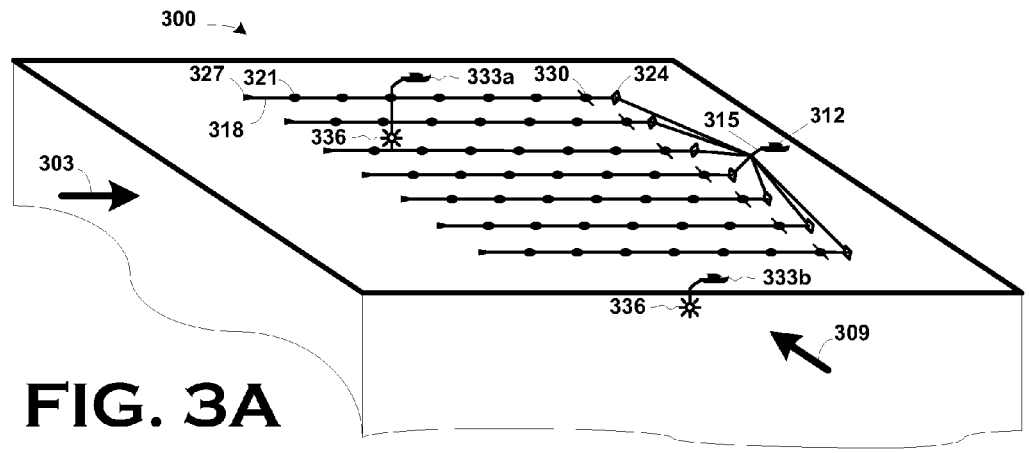
FIG. 3A-FIG. 3C depict a towed array, marine seismic survey by which seismic data may be acquired in one embodiment of a first aspect of the invention.
Figure 3B:
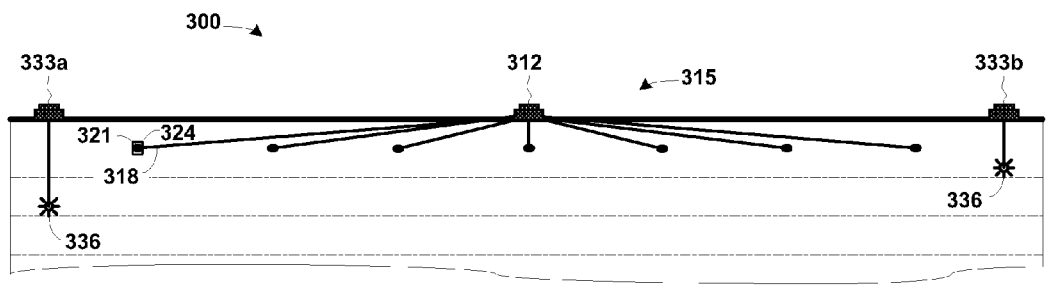
Figure 3C:
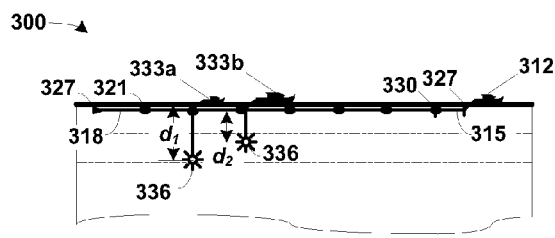

To further an understanding of the invention described above, one particular embodiment of the invention manifesting several aspects thereof will now be presented. Referring now to FIG. 3A-FIG. 3C, a towed array, marine seismic survey apparatus 300 is shown. FIG. 3A is a perspective view of the survey apparatus 300 deployed. FIG. 3B is a plan view of the survey from the direction indicated by the arrow 303 in FIG. 3A—i.e., from astern and inline of the survey apparatus 300. FIG. 3C is a plan view of the survey from the direction indicated by the arrow 306 in FIG. 3B—i.e., from the starboard, broadside.

A survey vessel 312 tows an array 315 of streamers 318 (only one indicated) comprised of a variety of seismic sensor sondes 321 (only one indicated) between a deflector 324 and a tail buoy 327. The instrumented sondes 321 house, in the illustrated embodiment, a pressure sensor 400, a particle motion sensor 403, and an orientation sensor 406, as is conceptually shown in FIG. 4.

The pressure sensor 400 may implemented using, e.g., a hydrophone such as is known to the art. The pressure sensor 400 acquires the "pressure data" 227 indicating the magnitude and time of arrival for passing wavefronts in a conventional manner well known to the art. The pressure sensor 400 may be any suitable pressure known to the art for this purpose.

The particle motion sensor 403 measures not only the magnitude of passing wavefronts, but also their direction. The particle motion sensor 403 may be implemented using, for example, at least two co-located sensors in different (preferably orthogonal) directions in the plane perpendicular to the inline axis of the streamer 318. Suitable particle motion sensors are disclosed in U.S. application Ser. No. 10/792,511 (Publication No. 2005/0194201); U.S. application Ser. No. 10/233,266 (2004/0042341); and U.S. Pat. No. 3,283,293. Thus, it would be possible to determine the direction of propagation for wavefronts detected by the pressure sensors 400.

Particle velocity is but one vector quantity associated with the passing wavefront that may be used. Thus, in some embodiments, instead of the particle velocity, the particle acceleration may be measured using a suitable accelerometer. Suitable accelerometers include geophone accelerometers ("GACs"), such as are commonly known in the art for use in land-based seismic surveying, or micro electromechanical systems ("MEMS") accelerometer. Suitable MEMS accelerometers are known to the art. For example, MEMS accelerometers are disclosed in U.S. Pat. No. 5,723,790; U.S. patent application Ser. No. 11/042,721 (Publication No. 2005/0160814); U.S. patent application Ser. No. 11/000,652 (Publication No. 2005/0202585); and International Patent Application Serial No. PCT/G2904/001036 (Publication No. WO 2004/081583). However, any suitable accelerometer known to the art may be used.

The streamer 318 also provides a way to measure or detect the orientation of the particle motion sensors 403 with respect to the sea-surface or gravity field. This is the function of the orientation sensor 406. The particle motion sensor 403 is ideally oriented to measure in the "true" vertical direction. However, this is frequently not the case, as the streamers 318 can rotate and twist during the seismic survey. It is therefore desirable to know the true orientation of the particle motion sensor 403 relative to the vertical so that a correction may be effected during processing.

This may be done using inclinometers, for example. The inclinometer may be a single and/or dual axis accelerometer formed on an integrated circuit chip, such as the ADXL 103/203 single/dual axis accelerometer produced by Analog Devices or that disclosed in U.S. application Ser. No. 10/623,904, entitled "Cable Motion Detection", filed Jul. 21, 2003, in the name of Kenneth E. Welker and Nicolas Goujon, and commonly assigned herewith. Alternatively, the DC component from MEMS sensors in embodiments where MEMS sensors are used. Note that this means, in embodiments using MEMS sensors, there may not be a separate orientation sensor 406.

Some embodiments may employ additional sensors over and above those shown. Some embodiments may employ another sensor to measure the inline particle velocity. If another particle motion sensor measuring the inline particle velocity is present an extra inclinometer measuring the inline angle of the sensor with respect to the sea-surface is included.

In general, it is desirable for the measurements of the particle motion sensors 403 be taken as close to the point the pressure data is acquired by the pressure sensors 400 as is reasonably possible to reduce pre-processing. However, it is not necessary that the particle motion sensor 403 be positioned together with the pressure sensor 400 within the sonde 321 as is the case for the illustrated embodiment. Thus, the sensors 400, 403, and 406 are co-located on the streamer 318, e.g., they are located within the same sonde 321. However, the sensors 400, 403, 406 need not be housed in the same sonde 321 to be co-located. Furthermore, as will be discussed further below, it is not required that the sensors 400, 403, and 406 be co-located. Alternative embodiments may position the particle motion sensors 403 on the streamer 318 without regard to the positions of the pressure sensors 400, even to the extent that the two groups of sensors may employ different inline spacings along the streamer 318. In these circumstances, vertical motion data or the pressure data can be interpolated inline during processing using techniques known to the art.

The sensors of the instrumented sondes 321 then transmit data representative of the detected quantity over the electrical leads of the streamer 318. The data from the pressure sensors 400, the particle motion sensors 403, and the sensor orientation sensors 406 may be transmitted over separate lines. However, this is not necessary to the practice of the invention. Size, weight, and power constraints will typically make separate lines undesirable. The data generated will therefore be interleaved with the seismic data. Techniques for interleaving information with this are known to the art. For instance, the two kinds of data may be multiplexed. Any suitable technique for interleaving data known to the art may be employed.

Referring now to FIG. 3A-FIG. 3C and FIG. 4, the data generated by the sensors 400, 403, and 406 of the instrumented sondes 321 is transmitted over the streamer 318 to a computing apparatus (not shown) aboard the survey vessel 312. As those in the art will appreciate, a variety of signals are transmitted up and down the streamer 318 during the seismic survey. For instance, power is transmitted to the electronic components (e.g., the pressure sensor 400 and particle motion sensor 403), control signals are sent to positioning elements (e.g., the deflectors and birds as are known in the art, which are not shown), and data is transmitted back to the survey vessel 312.

To this end, the streamer 318 provides a number of lines (i.e., a power lead 409, a command and control line 412, and a data line 415) over which these signals may be transmitted. Those in the art will further appreciate that there are a number of techniques that may be employed that may vary the number of lines used for this purpose. Furthermore, the streamer 318 will also typically include other structures, such as strengthening members (not shown), that are omitted for the sake of clarity.

The spacing, dimensions, and positioning of the array 315 may be implemented in accordance with conventional practice. For example, the illustrated embodiment employs seven streamers 318, each of which includes eight instrumented sondes 321. Those in the art having the benefit of this disclosure will appreciate that the number of streamers 318 and the number of sondes 321 will be highly implementation specific. Streamers 318, for instance, typically are several kilometers long, and so there are considerably greater numbers of sondes 321 in a typical towed array marine survey.

Returning now to FIG. 3A-FIG. 3C, a pair of source vessels 333a-333b, each of which tows a respective seismic source 336 are also shown. The present invention employs two seismic source signals generated from at least two different positions in order to obtain different polarization vectors. The characteristics of the sources (e.g., frequency content, strength, etc.) can be similar or different—this is immaterial to the practice of the invention. The sources 336 are impulse type sources and, more particularly, airguns such as are known in the art. However, any suitable acoustic source may be used. Thus, in some alternative embodiments, one or both of the sources 336 may be sweep sources as are known in the art. The seismic signal emitted by the sources 336 should have a high signal-to-noise ratio ("SNR"). Accordingly, some embodiments may reduce the tow speed of one or both of the vessels 333a-333b to, for example, 3 knots to reduce the strength of the interfering noise sources at high frequencies.

As those in the art will appreciate, the data collection through the survey apparatus described above will typically be susceptible to errors, or perturbations, in what may be called "physical model parameters". There are many kinds of physical model parameters in the construction and design of the survey apparatus 300 shown in FIG. 3A-FIG. 3C and described above. Two common types of perturbation errors arise from sensor misalignment and sensor sensitivities.

For example, the seismic data collected during a survey is typically collected in a Cartesian coordinate system defined by orthogonal x-y-z axes. The coordinate system used is illustrated in FIG. 5, and is defined relative to the sensors 400, 403, 406, first shown in FIG. 4, orientation within survey apparatus. More particularly, the x direction is "inline" with the streamer 318, the y direction is "crossline" to the streamer, and the z direction is vertical through the water column.

Figure 6A:
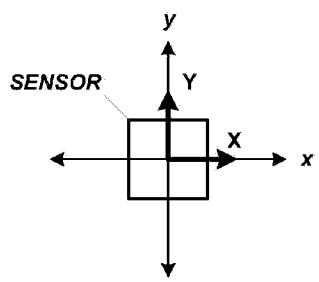
FIG. 6A-FIG. 6B and FIG. 7A-FIG. 7B illustrate sensor misalignments relative to the coordinate system shown in FIG. 3A-FIG. 3C giving rise to perturbations.
Figure 6B:
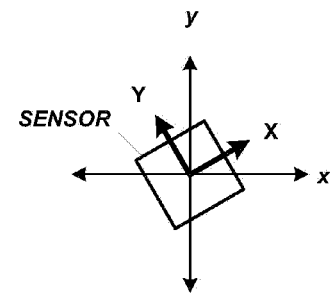
Figure 7A:
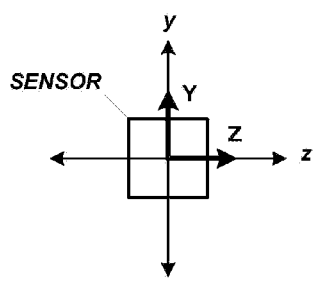
Figure 7B:
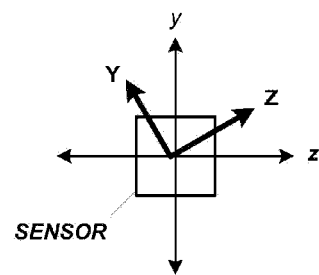

When the data is processed, the processing techniques generally assume that the sensors are squared within this coordinate system. It frequently happens, however, that the sensors are misaligned relative to the axes as is shown in FIG. 6A-FIG. 6B and FIG. 7A-FIG. 7B. FIG. 6A-FIG. 6B illustrate an x-y misalignment in which FIG. 6A depicts a "true" alignment and FIG. 6B depicts the misalignment. FIG. 7A-FIG. 7B depict a y-z misalignment in which FIG. 7A depicts a "true" alignment and FIG. 7B depicts the misalignment. As discussed above, multicomponent surveys sense not only the arrival of passing pressure wavefronts, but also their directions. This kind of misalignment error therefore causes errors in the direction detection.

As another example, for some sensors, the sensitivity of the sensor is not a constant but rather is a function of frequency. For these types of sensors, the sensitivity estimation and correction should be done for each frequency. For some other sensors, the response of the sensor to the signal can be described by some mathematical equation (e.g., a frequency selective filter defined in terms of resonance frequencies, and amplitudes at resonance frequencies). For these types of sensors, the response of the sensor to the signal at each frequency (i.e., the sensitivity at that frequency) can be estimated as described in the previous paragraph and then the resonance frequencies and the corresponding amplitudes at resonance frequencies can be estimated if needed.

The present invention therefore, in the illustrated embodiment, acquires a set of seismic "calibration" data prior to or after the conduct of the actual survey. This data is called "calibration data" because it is used to estimate the perturbations, and the estimated perturbations are used to mitigate noise in the acquired seismic data, as opposed to being seismic survey data. The calibration data is acquired using a seismic signal. The seismic sources 336 are triggered at different times to impart acoustic signals from different depths $d_1$ and $d_2$ shown in FIG. 3C. The order in which the seismic sources 336 are triggered, is immaterial to the practice of the invention. Similarly, the actual measures of the two depths $d_1$ and $d_2$ are not material so long as they are different.

Figure 8:
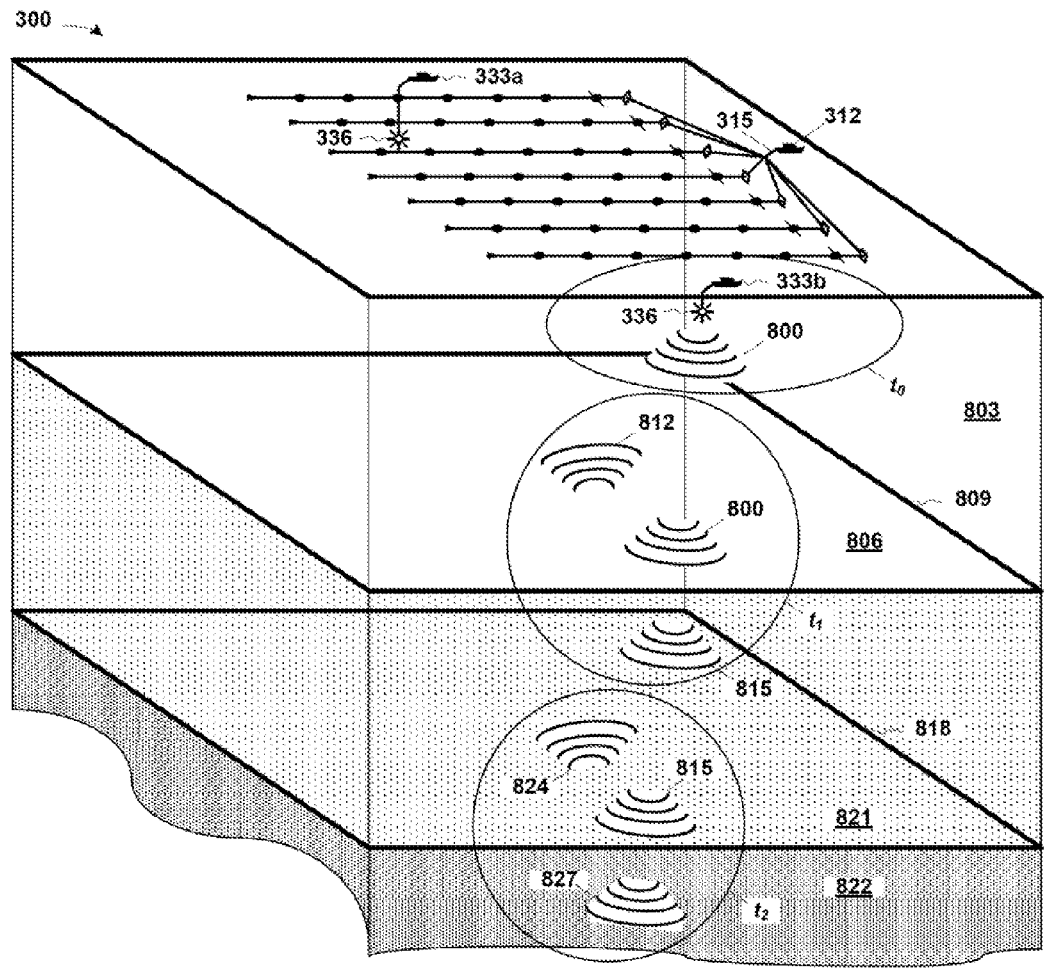
FIG. 8 depicts the collection of calibration data from one of two seismic sources first shown in FIG. 3A-FIG. 3C.

Calibration data collection from the starboard source 336 is illustrated in FIG. 8. FIG. 8 shows the process at three points in time, $t_0$, $t_1$, and $t_2$. Those in the art will appreciate that the survey apparatus 300 will be in motion and, unlike what is shown, its position relative to the acoustic signals and the geological formation will change over time.

At time $t_0$, the starboard source 336 is triggered and imparts a seismic signal 800 into the water column 803. At time $t_1$, the seismic signal 800 encounters a reflector 806, i.e., the interface between the water column 803 and the seabed 809. A portion 812 of the seismic signal 800 is reflected back to the survey apparatus 300 and a portion 815 continues propagating. The portion 815 encounters a second reflector 818, i.e., the interface between two layers 821, 822 in the seabed 806, at time $t_2$. A portion 824 is reflected back toward the survey apparatus 300 and a portion 827 continues to propagate. This continues until the propagating portions become too attenuated.

The reflected portions 812, 824, upon arrival at the survey apparatus 300, are detected by the pressure and particle motion sensors 400, 403. The detected reflections are digitized and transmitted to a data collection unit (not shown) aboard the survey vessel 312.

The process described for the starboard source 336 is then repeated for the port source 336.

The marine seismic survey is then performed in accordance with conventional practice. The seismic survey data resulting from the survey is also digitized and transmitted to the data collection unit aboard the survey vessel 312.

In the illustrated embodiment, the calibration data 231 is processed to obtain the perturbation data 236. A user (not shown) invokes the application 265 which then accesses the calibration data 231 and processes it. Referring now to FIG. 1, the application 265:

- accesses (at 110) a set of multicomponent calibration data exhibiting a plurality of polarization vectors at each of a plurality of co-located pressure and particle motion data points on a marine seismic survey apparatus;
- determines (at 120) a set of perturbations for the marine seismic survey apparatus from the polarization vectors; and
- determines (at 130) a set of calibration values corresponding to the perturbations.

The resulting calibration values 237 are then stored. The perturbations can then be corrected—e.g., by the application 265—to calibrate the sensor responses.

As mentioned briefly above, the present invention employs co-located pressure and particle motion data points. By using co-located (or nearest) pressure measurements as reference, the technique constrains the amplitude perturbations. Then, the direction of the source-to-receiver azimuth vector is used to compute the alignment perturbation. Hence, with the present invention, the amplitude and alignment perturbations are solved in two separate steps.

The advantage of this technique is that it corrects perturbation of sensors individually. In other words, unlike other, noise based perturbation estimation and correction techniques, the array length need not to be very long. The disadvantage is that, it requires one or more source boats to generate seismic signal for each sensor station.

Assume the following pressure wavefield P:

$$P = P\left(\frac{y\cos\phi}{c} + \frac{z\sin\phi}{c} - t\right) \quad (1)$$

wherein:
- y=spatial coordinate associated with cross-line direction;
- z=spatial coordinate associated with the vertical direction;
- c=acoustic speed of the pressure wavefield; and
- t=time.

Here, the signal is assumed to have a zero inline wavenumber; hence the signal is purely crossline. The particle velocity signals will be related to the pressure data as follows:

$$v_y = \frac{\cos\phi}{\rho c} P \quad (2)$$

$$v_z = \frac{\sin\phi}{\rho c} P$$

wherein:
- y≡the crossline direction;
- z≡the vertical direction;
- φ≡the polarization angle; and
- ρ≡the water density; and
- c≡as above.

The linearly polarized velocity measurement can be described by the following curve in the $v_y$-$v_z$ plane:

$$v_y \cos\phi + v_z \sin\phi = \frac{P}{\rho c} \quad (3)$$

wherein all quantities are as defined above. Note that, P can be measured from a hydrophone sensor co-located with particle motion sensors; and φ can be measured by using, for instance, Global Positioning System ("GPS") data. At this stage $v_y$ and $v_z$ are unknown true particle velocity data.

Suppose that in local coordinates, we have the following perturbed particle velocity measurements—$\bar{v}_y$, $\bar{v}_z$ and alignment angle $\bar{\phi}$. The unperturbed measurements in global coordinates would be:

$$\begin{bmatrix} v_y \\ v_z \end{bmatrix} = \begin{bmatrix} \cos(\bar{\phi}+\theta) & -\sin(\bar{\phi}+\theta) \\ \sin(\bar{\phi}+\theta) & \cos(\bar{\phi}+\theta) \end{bmatrix} \begin{bmatrix} 1/\alpha & 0 \\ 0 & 1/\beta \end{bmatrix} \begin{bmatrix} \bar{v}_y \\ \bar{v}_z \end{bmatrix} \quad (4)$$

where α, β, θ are amplitude and orientation calibration values. The perturbed measurements would have the following polarization in the $\bar{v}_y$-$\bar{v}_z$ plane:

$$\bar{v}_y \cos\Phi + \bar{v}_z \sin\Phi = \frac{P}{\rho c} \quad (5)$$

with some measurable angle Φ. Substituting the unperturbed measurements into Eq. (5) one obtains the equation for the following polarization curve:

$$\frac{P}{\rho c} = \bar{v}_y \cos\Phi + \bar{v}_z \sin\Phi \quad (6)$$

$$= [\cos\Phi \ \sin\Phi]\begin{bmatrix} \alpha & 0 \\ 0 & \beta \end{bmatrix}\begin{bmatrix} \cos(\bar{\phi}+\theta) & \sin(\bar{\phi}+\theta) \\ -\sin(\bar{\phi}+\theta) & \cos(\bar{\phi}+\theta) \end{bmatrix}\begin{bmatrix} v_y \\ v_z \end{bmatrix}$$

$$= (\alpha\cos\Phi\cos(\bar{\phi}+\theta) - \beta\sin\Phi\sin(\bar{\phi}+\theta))v_y +$$

$$(\alpha\cos\Phi\sin(\bar{\phi}+\theta) + \beta\sin\Phi\cos(\bar{\phi}+\theta))v_z$$

Note that in this equation, α, β, θ are unknowns; and $\bar{\phi}$, P, Φ are measured quantities. We would like to select the values of the parameters α, β, θ such that, Eq. (6) turns into Eq. (3). In other words, we would like to have $$\frac{\alpha\cos\Phi\cos(\bar{\phi}+\theta) - \beta\sin\Phi\sin(\bar{\phi}+\theta)}{\sqrt{\alpha^2\cos^2\Phi + \beta^2\sin^2\Phi}} = \cos\phi \quad (7)$$

$$\frac{\alpha\cos\Phi\sin(\bar{\phi}+\theta) + \beta\sin\Phi\cos(\bar{\phi}+\theta)}{\sqrt{\alpha^2\cos^2\Phi + \beta^2\sin^2\Phi}} = \sin\phi$$

$$\frac{\bar{P}}{\sqrt{\alpha^2\cos^2\Phi + \beta^2\sin^2\Phi}} = P$$

The last equation says that, $\alpha$, $\beta$ should satisfy:

$$\alpha^2 P^2 \cos^2\Phi + \beta^2 P^2 \sin^2\Phi = \bar{P}^2 \quad (8)$$

If the values $\alpha$, $\beta$ which would satisfy Eq. (8) are found, then $\theta$ is estimated from the following set of equations:

$$\cos(\theta + \bar{\phi})(\alpha\cos\Phi) - \sin(\theta + \bar{\phi})(\beta\sin\Phi) = \sqrt{\alpha^2\cos^2\Phi + \beta^2\sin^2\Phi}\,\cos\phi \quad (9)$$

$$\cos(\theta + \bar{\phi})(\beta\sin\Phi) + \sin(\theta + \bar{\phi})(\alpha\cos\Phi) = \sqrt{\alpha^2\cos^2\Phi + \beta^2\sin^2\Phi}\,\sin\phi$$

The last set of equations can be equivalently written s:

$$\cos\theta(\alpha\cos\Phi) - \sin\theta(\beta\sin\Phi) = \sqrt{\alpha^2\cos^2\Phi + \beta^2\sin^2\Phi}\,\cos(\phi - \bar{\phi}) \quad (10)$$

$$\cos\theta(\beta\sin\Phi) + \sin\theta(\alpha\cos\Phi) = \sqrt{\alpha^2\cos^2\Phi + \beta^2\sin^2\Phi}\,\sin(\phi - \bar{\phi})$$

The problem is that there are infinitely many solutions for $\alpha$, $\beta$, and $\theta$ which would satisfy Eq. (7). One trivial solution is: $\alpha=0$, $\beta=\bar{P}/(P\sin\Phi)$ and $\theta=\phi-\bar{\phi}+\pi/2$. Hence, one cannot estimate amplitude and alignment perturbation simultaneously by using a single signal measurement. Polarization measurements corresponding to two or more polarization angles will fix this problem. For instance, if one measures polarization corresponding to M sources, then $\alpha$, $\beta$ are found by solving $$\begin{bmatrix} P_1^2\cos^2\bar{\phi_1} & P_1^2\sin^2\bar{\phi_1} \\ P_2^2\cos^2\bar{\phi_2} & P_1^2\sin^2\bar{\phi_1} \\ \vdots & \vdots \\ P_M^2\cos^2\bar{\phi_M} & P_1^2\sin^2\bar{\phi_1} \end{bmatrix} \begin{bmatrix} \alpha^2 \\ \beta^2 \end{bmatrix} = \begin{bmatrix} \bar{P_1^2} \\ \bar{P_2^2} \\ \vdots \\ \bar{P_M^2} \end{bmatrix} \quad (11)$$

in least squares sense. Then, $\cos\theta$ and $\sin\theta$ are estimate by solving $$\begin{bmatrix} \alpha\cos\Phi_1 & \beta\sin\Phi_1 \\ \beta\sin\Phi_1 & \alpha\cos\Phi_1 \\ \alpha\cos\Phi_2 & \beta\sin\Phi_2 \\ \beta\sin\Phi_2 & \alpha\cos\Phi_2 \\ \vdots & \vdots \\ \alpha\cos\Phi_M & \beta\sin\Phi_M \\ \beta\sin\Phi_M & \alpha\cos\Phi_M \end{bmatrix} \begin{bmatrix} \cos\theta \\ \sin\theta \end{bmatrix} = \begin{bmatrix} \sqrt{\alpha^2\cos^2\Phi_1 + \beta^2\sin^2\Phi_1}\,\cos(\phi_1 - \bar{\phi}_1) \\ \sqrt{\alpha^2\cos^2\Phi_1 + \beta^2\sin^2\Phi_1}\,\sin(\phi_1 - \bar{\phi}_1) \\ \sqrt{\alpha^2\cos^2\Phi_2 + \beta^2\sin^2\Phi_2}\,\cos(\phi_2 - \bar{\phi}_2) \\ \sqrt{\alpha^2\cos^2\Phi_2 + \beta^2\sin^2\Phi_2}\,\sin(\phi_2 - \bar{\phi}_2) \\ \vdots \\ \sqrt{\alpha^2\cos^2\Phi_M + \beta^2\sin^2\Phi_M}\,\cos(\phi_M - \bar{\phi}_M) \\ \sqrt{\alpha^2\cos^2\Phi_M + \beta^2\sin^2\Phi_M}\,\sin(\phi_M - \bar{\phi}_M) \end{bmatrix} \quad (12)$$

again, in least squares sense.

There is a special case where there is no amplitude perturbation. Suppose that amplitude perturbations on particle motion sensors have been corrected by using some alternative method; and the problem is estimation of the alignment perturbation error and the sensitivity of the hydrophone which is assumed to be uncalibrated. We assume that the amplitude correction factor for the hydrophone is $\eta$. Then the set of equations given by Eq. (8) simplifies to:

$$\cos(\bar{\phi}+\theta+\Phi) = \cos\phi$$

$$\sin(\bar{\phi}+\theta+\Phi) = \cos\phi$$

$$\bar{P} = \eta P \quad (13)$$

Hence, the alignment perturbation error is found as $\theta = -(\bar{\phi}+\Phi)$, and the hydrophone amplitude perturbation is found from the ratio of $\bar{P}$ and P. Hence, in this case a single source measurement is enough to correct the alignment perturbation on the particle motion sensors and the amplitude perturbation on the hydrophone.

Figure 9A:
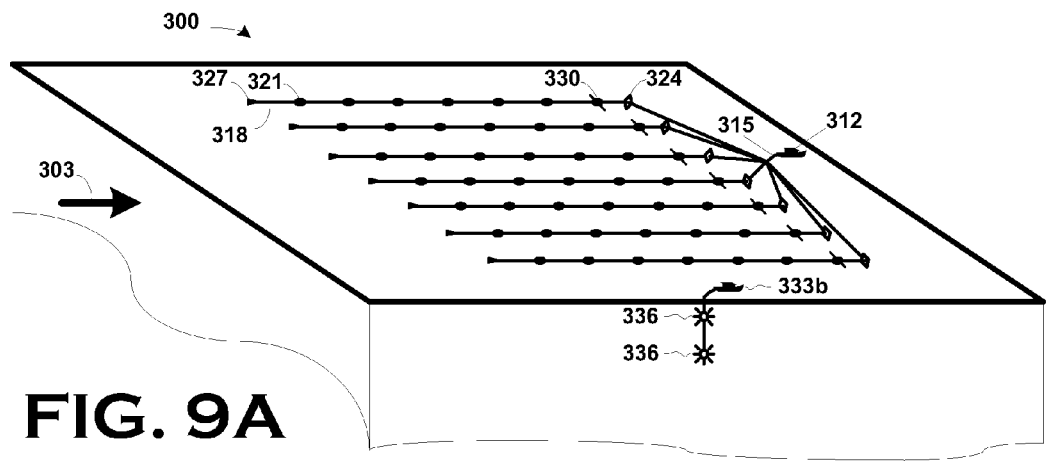
FIG. 9A-FIG. 9B depict an embodiment alternative to that shown in FIG. 3A-FIG. 3C in which two seismic sources are deployed from the same survey vessel.
Figure 9B:
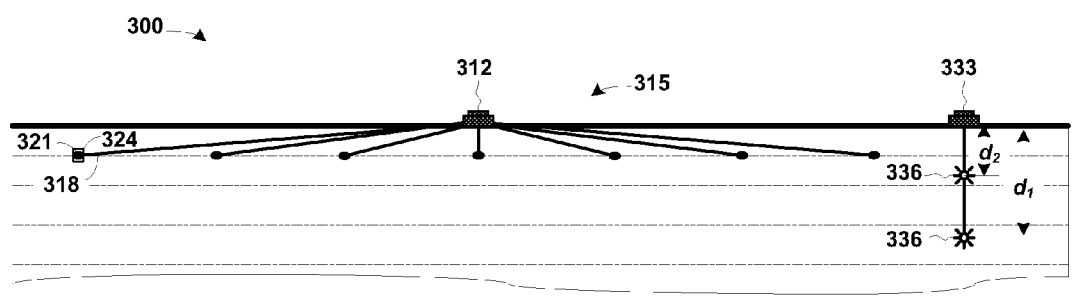

The present invention admits variation in the location of the seismic sources 336, first shown in FIG. 3A-FIG. 3C, from which the calibration data 231, first shown in FIG. 2, is acquired. In the embodiments described above, the seismic sources 336 are located broadside to the survey apparatus 300 on both the starboard and port sides from two different source vessels 333a, 333b. Alternative embodiments may, for example, use a single source vessel 333 suspending a single seismic source 336 to depth $d_1$ from the port side and then, subsequently, to depth $d_2$ on the starboard side. FIG. 9A-FIG. 9B illustrate an alternative embodiment in which the two sources 336 are suspended at two different depths $d_1$, $d_2$, from a single source vessel 333 broadside to the survey apparatus 300 on just one side—e.g., the starboard side. Those in the art having the benefit of this disclosure will appreciate still other variations on this theme.

Figure 10:
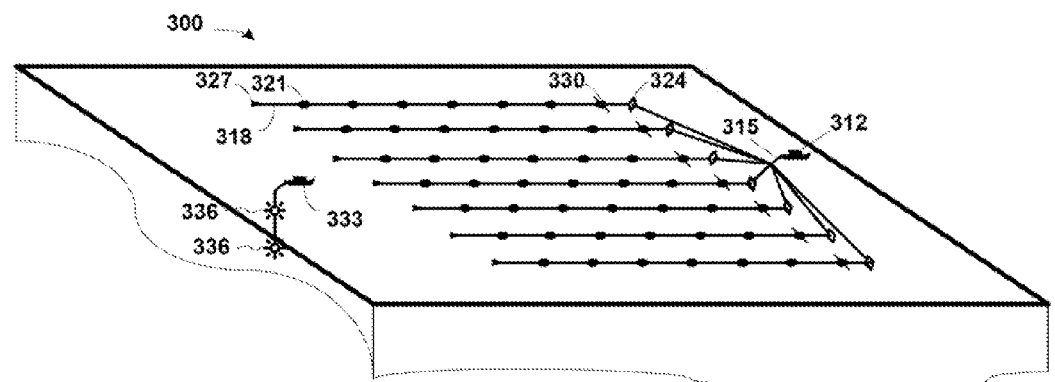
FIG. 10 depicts an embodiment alternative to that shown in FIG. 3A-FIG. 3C employing inline sources.
Figure 11:
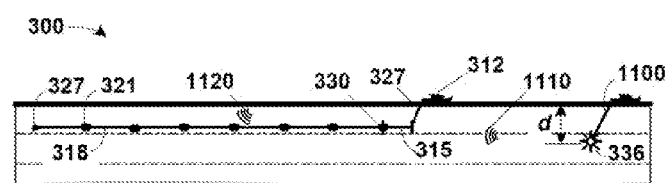
FIG. 11 depicts an embodiment alternative to that shown in FIG. 3A-FIG. 3C employing the survey source.

Some embodiments may even use inline seismic sources 336 (only one indicated), as shown in FIG. 10. Or, the seismic source used in operation—i.e., during the survey—can generate the source signal. One such embodiment is shown in FIG. 11. However, in these embodiments, the cable 1100 for the seismic sources 336 is towed at a depth d deep enough so that the time delay between the direct arrival 1110 and ghost reflection 1120 is large enough that they can be distinguished. Note also that the seismic source 336 will be used to acquire calibration data 231 from two different locations as was discussed above.

Figure 4:
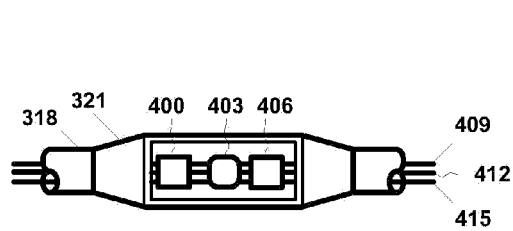
FIG. 4 conceptually depicts one particular sensor arrangement for the seismic survey of FIG. 3A-FIG. 3C.
Figure 5:
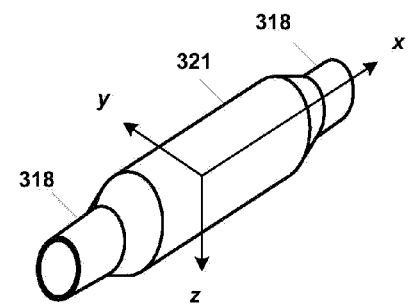
FIG. 5 illustrates the coordinate system in which seismic data is acquired.

In the embodiments illustrated above, the co-located measurements from which the perturbation noise is determined are acquired using co-located sensors, such as is shown in FIG. 4. However, the invention is not so limited. Some alternative embodiments may, for example, interpolate data points from acquired data. Consider, for example, the portion of the streamer 1200, shown in FIG. 12.

If the pressure sensors are not co-located with particle motion sensors, the pressure measurements can be interpolated to the positions of the particle motion sensor positions. In general, it is believed that the interpolation of the pressure data to particle motion sensor locations would be more accurate than using, for instance, the nearest pressure measurement, for the determination of perturbation noise. The interpolation is straightforward, especially when the pressure sensors are uniformly spaced along the streamer 1200.

Figure 12:
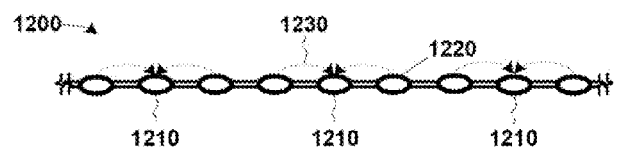
FIG. 12 conceptually illustrates the interpolation of data from the location of acquisition to the position of a paired sensor in some alternative embodiments.

So, pressure sensors and particle motion sensors need not necessarily be co-located in all embodiments. In FIG. 12, the sondes 1210 house both pressure sensors 400 and particle motion sensors 403, as shown in FIG. 4. The remaining sondes 1220 (only one indicated) house only pressure sensors 400. The pressure data acquired by the pressure sensors 400 of the sondes 1220 can then be interpolated, as conceptually indicated by the broken arrows 1230 (only one indicated), to the position of the nearest particle motion measurement location. The interpolation is performed during processing. Note that a particle motion sensor 403 may be paired with more than one or two pressure sensors in this manner. Accordingly, the invention does not require that calibration data 231 be acquired from co-located sensors, but only paired sensors and that the pairing does not require a one-to-one correspondence.

Figure 13A:
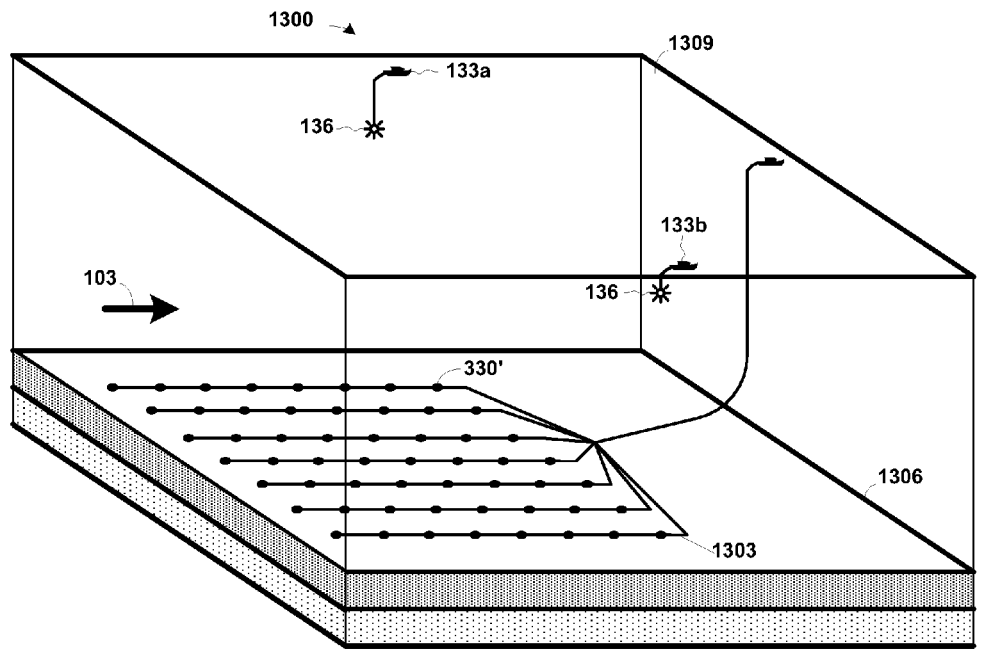
FIG. 13A and FIG. 13B depicts a seabed survey with which the present invention may be practiced in some alternative embodiments.
Figure 13B:
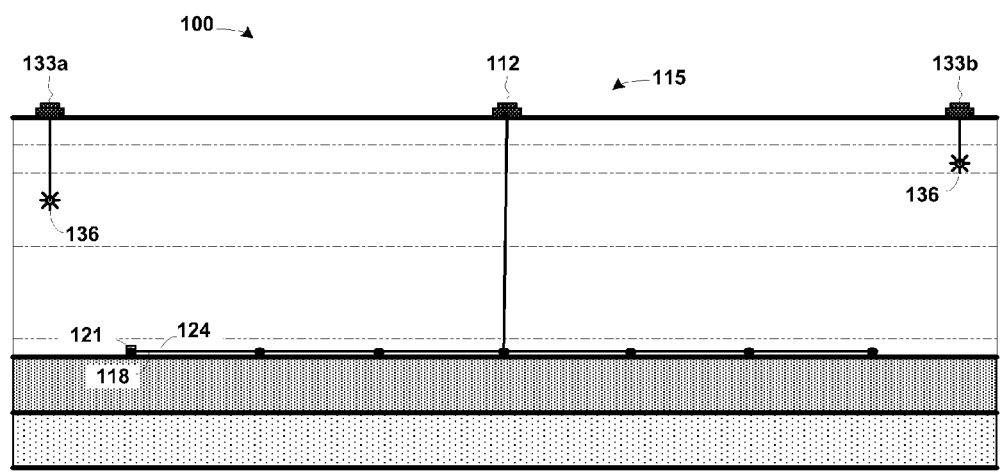

The method of the present invention can also be applied to multi-component seabed seismic data, as well. FIG. 13A-FIG. 13B depicts a seabed survey 1300 in a stylized fashion. A plurality of ocean bottom cables 1303 (only one indicated) each comprising a plurality of instrumented sondes 330' (only one indicated), are positioned on the seabed 1306. The sondes 330' collect data from reflections generated as previously described and transmits it to the surface 1309. The data collection, however, is subject to commonly observed "shear (noise) on vertical".

Recall also that the acquired survey data 225 and calibration data 231 comprise pressure data 227, 232 and particle motion data 228, 233. In the illustrated embodiments, the particle motion data 228, 233 that is acquired is velocity data, or the particle displacement of the passing wavefront. This is but one type of the particle motion data suitable for use in the present invention. Alternative embodiments may, for instance, acquire the acceleration of the passing wavefront, i.e., the second derivative in time of the particle displacement. Other quantities may also be suitable for use in the present invention, as well. Note further that some embodiments may acquire one type of the particle motion data and convert it in processing to use another. Thus, some embodiments might acquire the velocity data, process it to take the time derivative, and then use the acceleration data in the rest of the method of the invention. Or, some embodiment might acquire the acceleration, integrate it over time to get the velocity, and then use the velocity data in the rest of the method.

The presently disclosed technique is not actually a part of the marine seismic survey. It therefore can be done not only before the survey as described above, but also in between or after the survey, too. Generally, however, conducting this type of calibration should yield more benefit if performed prior to the survey. In this situation, the technique as described above can be generally summarize as follows:
  acquired calibration data;
  estimate perturbations; and
  determine calibration values corresponding to estimated perturbations. (For instance if there is sensitivity perturbation, we identify how much the sensitivity differs from the nominal sensitivity, and we correct for this deviation when we acquired the seismic survey data)

During the survey, however, the technique can be summarized as follows:
  acquire perturbed data
  correct response of the sensors by using the estimated calibration values (correction of the sensor response will remove the perturbation noise)
However, in both circumstance, techniques can be performed, e.g., in accordance with the method 100 illustrated in FIG. 1.

Note that the data used for perturbation estimation is seismic data, in the sense that, it is generated by, say, an airgun and propagates in sea, etc. However this data is not the seismic survey data that will be used for characterization of the earth layers, hydrocarbon locations etc., in analyzing the underlying geological formation. Hence, perturbation estimation can be thought as a preprocessing step before starting to acquire the survey data although it need not necessarily be performed pre-survey.

It is apparent from the above discussion that, in one aspect, the present invention includes a computer-implemented method, such as the method 100 of FIG. 1. In another aspect, the invention includes a computing apparatus such as the computing apparatus 200 of FIG. 2, programmed to perform such a method. In still another aspect, the invention includes a program storage medium such as the optical disk 220, encoded with instructions that, when executed by a computing apparatus, performs a method such as the method 100.

Thus, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The following patents are incorporated by reference as if set forth verbatim herein for their teachings regarding the construction and operation of particle motion sensors:

- U.S. application Ser. No. 10/792,511, entitled "Particle Motion Sensor for Marine Seismic Sensor Streamers," filed Mar. 3, 2004, in the name of the inventors Stig Rune Lennart Tenghamn and Andre Stenzel (published Sep. 8, 2005, as Publication No. 2005/0194201);
- U.S. application Ser. No. 10/233,266, entitled "Apparatus and Methods for Multicomponent Marine Geophysical Data Gathering," filed Aug. 30, 2002, in the name of the inventors Stig Rune Lennart Tenghamn et al. (published Mar. 4, 2004, as Publication No. 2004/0042341); and
- U.S. Pat. No. 3,283,293, entitled "Particle Velocity Detector and Means for Canceling the Effects of Motional Disturbances Applied Thereto," naming G. M. Pavey, Jr. et al. as inventors, and issued Nov. 1, 1966.

The following patents are incorporated by reference as if set forth verbatim herein for their teachings regarding the construction and operation of MEMS accelerometers:

- U.S. Pat. No. 5,723,790, entitled "Monocrystalline Accelerometer and Angular Rate Sensor and Methods for Making and Using Same", issued Mar. 3, 1998, and naming Gert Andersson as inventor;
- U.S. patent application Ser. No. 11/042,721, entitled "System and Method for a Three-Axis MEMS Accelerometer", filed Jun. 24, 2005, published Jul. 28, 2005, as Publication No. 2005/0160814 A1, and naming Vladimir Vaganov and Nikolai Belov as inventors;
- U.S. patent application Ser. No. 11/000,652, entitled "Micro-Machined Electromechanical System (MEMS) Accelerometer Device Having Arcuately Shaped Flexures", filed Nov. 30, 2004, published Sep. 15, 2005, as Publication No. 2005/0202585 A1, and naming Mark H. Eskridge as inventor; and
- International Patent Application Serial No. PCT/G2904/001036, entitled "MEMS Accelerometers", filed Mar. 11, 2004, published Sep. 25, 2004, as Publication No. WO 2004/081583, and naming Diana Hodgins and Joseph Mark Hatt as inventors.

The following patent application is incorporated by reference as if set forth verbatim herein for their teachings regarding inclinometers:

- U.S. application Ser. No. 10/623,904, entitled "Cable Motion Detection", filed Jul. 21, 2003, in the name of Kenneth E. Welker and Nicolas Goujon, and commonly assigned herewith.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

We claim:

1. A computer-implemented method, comprising:
   accessing a set of multicomponent calibration data exhibiting a plurality of polarization vectors in y and z directions at each of a plurality of paired pressure and particle motion data points on a marine seismic survey apparatus;
   determining a set of perturbations for the marine seismic survey apparatus from the polarization vectors, wherein the perturbations comprise orientation alignment perturbation errors in the y and z directions; and
   determining a set of calibration values corresponding to the perturbations.

2. The computer-implemented method of claim 1, wherein accessing the multicomponent calibration data includes accessing a set of acquired multicomponent calibration data.

3. The computer-implemented method of claim 1, wherein accessing the multicomponent calibration data includes accessing a set of acquired and interpolated multicomponent calibration data.

4. The computer-implemented method of claim 1, further comprising interpolating data from measurements acquired through paired sensors to generate a plurality of data points to generate at least a portion of the calibration data.

5. The computer-implemented method of claim 1, wherein determining the set of perturbations comprises relating the polarization vectors to physical model parameter errors.

6. The computer-implemented method of claim 5, wherein relating the polarization vectors to physical model parameter errors comprises relating the polarization vectors to sensor orientation misalignment, sensor sensitivity, or both sensor orientation and sensor sensitivity.

7. The computer-implemented method of claim 5, wherein relating the polarization vectors to physical model parameter errors includes relating the polarization vectors to sensor misalignment angles relative to cable axes.

8. The computer-implemented method of claim 1, further comprising mitigating the determined perturbations in a set of marine seismic survey data.

9. The computer-implemented method of claim 8, wherein mitigating the determined perturbations in the seismic survey data comprises removing the determined perturbations from the seismic survey data.

10. The computer-implemented method of claim 9, wherein removing the determined perturbations from the seismic survey data includes calibrating the seismic survey data to correct a deviation of a response of a sensor from a nominal response.

11. The computer-implemented method of claim 8, wherein mitigating the determined perturbations in the seismic survey data includes calibrating the seismic survey data to correct a deviation of a response of a sensor from a nominal response.

12. The computer-implemented method of claim 1, wherein the paired pressure and particle motion data points are co-located.

13. The computer-implemented method of claim 1, wherein the orientation alignment perturbation errors are caused by a misaligned sensor relative to a corresponding streamer in the marine seismic survey apparatus.

14. The computer-implemented method of claim 13, wherein at least one of the sensor's x, y, or z axes is out of alignment with a corresponding in-line, cross-line, or depth axes of the corresponding streamer.

15. The computer-implemented method of claim 13, wherein the misaligned sensor is a particle motion sensor.

16. The computer-implemented method of claim 1, wherein determining the set of perturbations for the marine seismic survey apparatus further comprises computing an alignment perturbation.

17. The computer-implemented method of claim 16, wherein computing the alignment perturbation comprises using a direction of a source-to-receiver azimuth vector to compute the alignment perturbation.

18. The computer-implemented method of claim 1, wherein the marine seismic survey apparatus comprises a particle motion sensor, and further comprising using the calibration values to correct an alignment perturbation of the particle motion sensor.

19. The computer-implemented method of claim 1, wherein the calibration data is acquired separately from seismic data acquired using the marine seismic survey apparatus.

20. The computer-implemented method of claim 1, wherein the perturbations further comprise orientation alignment perturbation errors in the x direction.

21. The computer-implemented method of claim 1, wherein accessing the set of multicomponent calibration data comprises accessing multicomponent calibration data that had been received from a first sensor corresponding to a y direction and a second sensor corresponding to a z direction.

22. The computer-implemented method of claim 21, wherein the first sensor is a particle motion sensor, and wherein the second sensor is an orientation sensor.

23. The computer-implemented method of claim 22, wherein the orientation sensor is configured to detect orientation of the particle motion sensor.

24. A program storage medium, encoded with instructions that, when executed by a computing device, perform a method comprising:
   accessing a set of multicomponent calibration data exhibiting a plurality of polarization vectors in y and z directions at each of a plurality of paired pressure and particle motion data points on a marine seismic survey apparatus;
   determining a set of perturbations for the marine seismic survey apparatus from the polarization vectors, wherein the perturbations comprise orientation alignment perturbation errors in the y and z directions; and
   determining a set of calibration values corresponding to the perturbations.

25. The program storage medium of claim 24, wherein accessing the multicomponent calibration data includes accessing a set of acquired multicomponent calibration data.

26. The program storage medium of claim 24, wherein accessing the multicomponent calibration data includes accessing a set of acquired and interpolated multicomponent calibration data.

27. The program storage medium of claim 24, wherein the method further comprises interpolating data from measurements acquired through paired sensors to generate a plurality of data points to generate at least a portion of the calibration data.

28. The program storage medium of claim 24, wherein determining the perturbations includes relating the polarization vectors to physical model parameter errors.

29. The program storage medium of claim 24, wherein the method further comprises mitigating the determined perturbations in a set of marine seismic survey data.

30. The program storage medium of claim 24, wherein the paired pressure and particle motion data points are co-located.

31. The program storage medium of claim 24, wherein the multicomponent calibration data are acquired by imparting seismic signals at a plurality of depths.

32. A programmed computing apparatus, comprising:
   a processor;
   a bus system;
   a storage communicating with the processor over the bus system; and
      a software component that, when invoked by the processor, performs a method including:
      accessing a set of multicomponent calibration data exhibiting a plurality of polarization vectors in y and z directions at each of a plurality of paired pressure and particle motion data points on a marine seismic survey apparatus;
      determining a set of perturbations for the marine seismic survey apparatus from the polarization vectors, wherein the perturbations comprise orientation alignment perturbation errors in the v and z directions; and
      determining a set of calibration values corresponding to the perturbations.

33. The programmed computing apparatus of claim 32, wherein accessing the multicomponent calibration data includes accessing a set of acquired multicomponent calibration data.

34. The programmed computing apparatus of claim 32, wherein accessing the multicomponent calibration data includes accessing a set of acquired and interpolated multicomponent calibration data.

35. The programmed computing apparatus of claim 32, wherein the method further comprises interpolating data from measurements acquired through paired sensors to generate a plurality of data points to generate at least a portion of the calibration data.

36. The programmed computing apparatus of claim 32, wherein determining the perturbations comprises relating the polarization vectors to physical model parameter errors.

37. The programmed computing apparatus of claim 32, wherein the method further comprises mitigating the determined perturbations in a set of marine seismic survey data.

38. The programmed computing apparatus of claim 32, wherein the paired pressure and particle motion data points are co-located.

39. The programmed computing apparatus of claim 32, wherein the multicomponent calibration data are acquired by imparting seismic signals at a plurality of depths.

* * * * *